(12) United States Patent
Chang

(10) Patent No.: US 8,195,043 B2
(45) Date of Patent: Jun. 5, 2012

(54) THREE-DIMENSIONAL CAMERA MODULE

(75) Inventor: Jen-Tsorng Chang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 124 days.

(21) Appl. No.: 12/840,189

(22) Filed: Jul. 20, 2010

(65) Prior Publication Data

US 2011/0150453 A1    Jun. 23, 2011

(30) Foreign Application Priority Data

Dec. 22, 2009  (CN) .......................... 2009 1 0311977

(51) Int. Cl.
*G03B 35/08* (2006.01)
*G03B 35/10* (2006.01)

(52) U.S. Cl. .......................................... 396/326; 348/42

(58) Field of Classification Search .................. 396/325, 396/326, 329; 348/42, 47, 48
See application file for complete search history.

(56) References Cited

U.S. PATENT DOCUMENTS

| | | | | |
|---|---|---|---|---|
| 4,881,122 A | * | 11/1989 | Murakami | 348/47 |
| 5,225,941 A | * | 7/1993 | Saito et al. | 359/824 |
| 5,668,595 A | * | 9/1997 | Katayama et al. | 348/218.1 |
| 5,864,360 A | * | 1/1999 | Okauchi et al. | 348/47 |
| 5,978,015 A | * | 11/1999 | Ishibashi et al. | 348/47 |
| 6,701,081 B1 | * | 3/2004 | Dwyer et al. | 396/329 |
| 7,061,532 B2 | * | 6/2006 | Silverstein | 348/335 |
| 7,190,389 B1 | * | 3/2007 | Abe et al. | 348/42 |
| 7,832,947 B2 | * | 11/2010 | Takahashi | 396/428 |

FOREIGN PATENT DOCUMENTS

| | | | | |
|---|---|---|---|---|
| JP | 2005024629 A | * | 1/2005 | |
| JP | 2005039400 A | * | 2/2005 | |
| JP | 2005250396 A | * | 9/2005 | |
| JP | 2008020543 A | * | 1/2008 | |

* cited by examiner

*Primary Examiner* — Clayton E LaBalle
*Assistant Examiner* — Leon W. Rhodes, Jr.
(74) *Attorney, Agent, or Firm* — Altis Law Group, Inc.

(57) ABSTRACT

A three-dimensional camera module includes a base plate, a first rotating shaft, a first supporting member, a second supporting member, a first lens unit, a second lens unit mounted, a first piezoelectric actuator, a second piezoelectric actuator and a image processor. The first rotating shaft and the second rotating shaft is positioned on the base plate. The first supporting member and the second supporting member are rotatably fixed to the first rotating shaft and second rotating shaft, respectively. The first lens unit and the second lens unit are mounted on the first supporting member and the second supporting member, respectively. The first piezoelectric actuator abuts the first supporting member to drive the first supporting member to pivot around the first rotating shaft. The second piezoelectric actuator abuts the second supporting member. Both of the first lens unit and the second lens unit are electrically connected to the image processor.

18 Claims, 3 Drawing Sheets

THREE-DIMENSIONAL CAMERA MODULE

BACKGROUND

1. Technical Field

The present disclosure relates to camera modules, and particularly, to a camera module capable of producing a three-dimensional image.

2. Description of Related Art

With the ongoing development of microcircuitry and multimedia technology, digital camera modules have entered widespread use. However, such camera modules can only capture a two-dimensional image of an object.

People can perceive objects as three-dimensional because their eyes are separated by a distance, this leads to binocular parallax viewing objects.

In order to reproduce this effect using technology, two lens units should be provided to pick up two images of the same object from different directions to create binocular parallax effect. Typically, the two lens units are fixedly positioned in the camera, such that the viewpoint of the two lens units cannot be changed unless the camera is moved. Thus, it is inconvenient to use the camera module to achieve a three-dimensional image.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
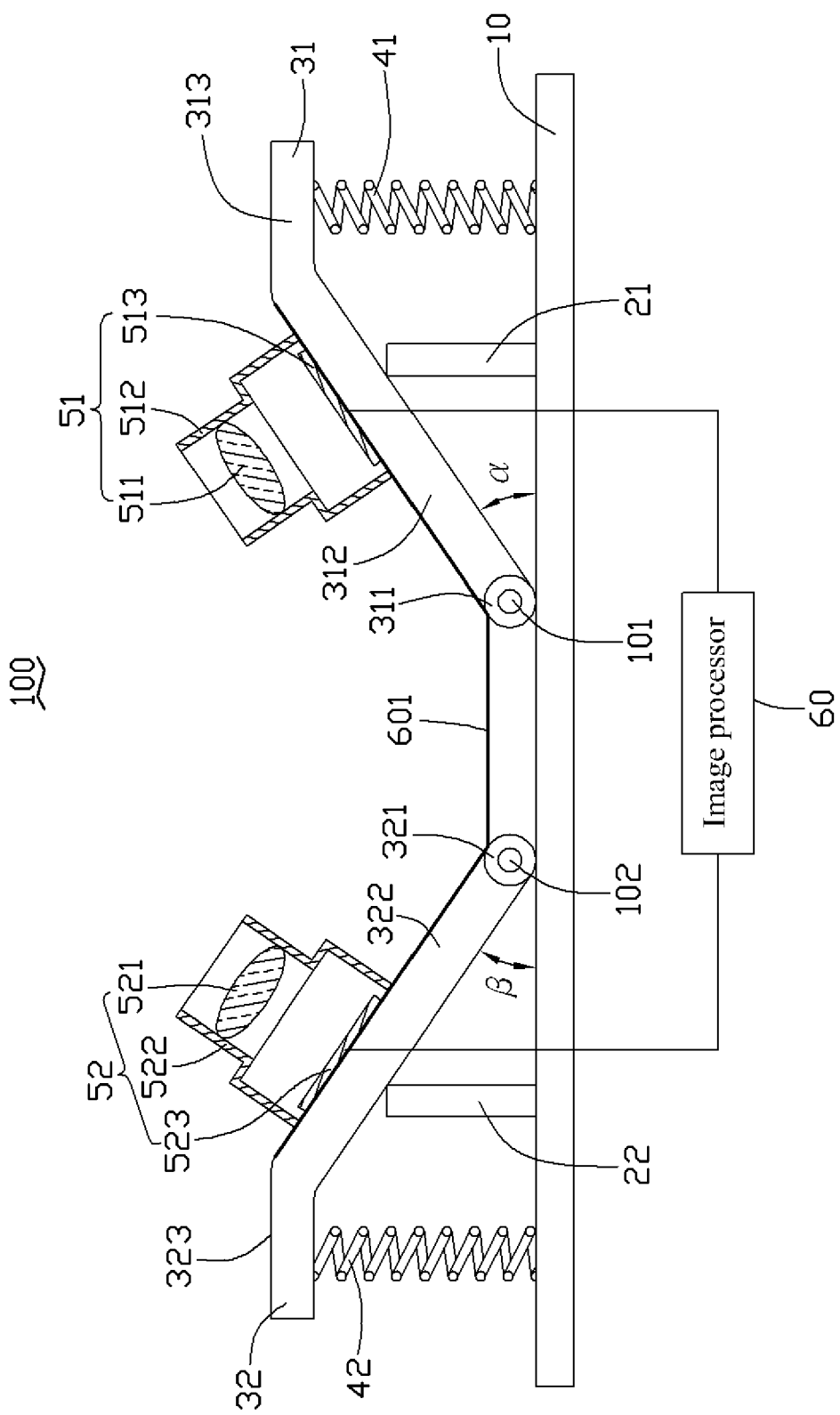
FIG. 1 is a schematic, cross-sectional view of an embodiment of a three-dimensional camera module.

Referring to FIG. 1, an embodiment of a three-dimensional (3D) camera module 100 includes a base plate 10, a first piezoelectric actuator 21, a second piezoelectric actuator 22, a first supporting member 31, a second supporting member 32, a first elastic member 41, a second elastic member 42, a first lens unit 51, a second lens unit 52, and an image processor 60.

The 3D camera module 100 further includes a first rotating shaft 101 and a second rotating shaft 102. The first and second rotating shafts 101, 102 are positioned on the base plate 10. The first rotating shaft 101 and the second rotating shaft 102 are spaced apart and aligned parallel to each other.

The first piezoelectric actuator 21 and the second piezoelectric actuator 22 are fixed to the base plate 10. The first piezoelectric actuator 21 is positioned on the base plate 10 at a side of the first rotating shaft 101 away from the second rotating shaft 102. The first piezoelectric actuator 21 is separated from the first rotating shaft 101 a predetermined distance. Likewise, the second piezoelectric actuator 22 is positioned on the base plate 10 at a side of the second rotating shaft 102 away from the first rotating shaft 101. The second piezoelectric actuator 22 is separated from the second rotating shaft 102 a predetermined distance.

The first supporting member 31 includes a first fixing portion 311, a first supporting portion 312, and a first balance portion 313. The first fixing portion 311 is rotatably connected to the first rotating shaft 101. The first supporting portion 312 interconnects the first fixing portion 311 and the first balance portion 313. The first supporting portion 312 is slanted relative to the base plate 10 such that an angle α is defined by the first supporting portion 312 and the base plate 10. The first supporting portion 312 abuts the first piezoelectric actuator 21, such that the first supporting member 31 can be driven by the first piezoelectric actuator 21 to pivot around the first rotating shaft 101. The first supporting portion 312 and the first balance portion 313 defines a obtuse angle. The second supporting member 32 is similar to the first supporting member 31, and includes a second fixing portion 321, a second supporting portion 322, and a second balance portion 323. The second supporting portion 322 is slanted relative to the base plate 10 such that an angle β is defined by the second supporting portion 322 and the base plate 10.

Two ends of the first elastic member 41 are respectively connected to the base plate 10 and the first balance portion 313. Likewise, two ends of the second elastic member 42 are respectively connected to the base plate 10 and the second balance portion 323. The first elastic member 41 is configured to provide tension to the first supporting member 31 to allow smooth pivoting of the first supporting member 31. For example, if the initial values of the angle α and the angle β are 30 degrees, when the first piezoelectric actuator 21 and the second piezoelectric actuator 22 drive the first supporting member 31 and the second supporting member 32 to pivot around the first rotating shaft 101 and the second rotating shaft 102 respectively, and the angle α and the angle β can be changed to 40 degrees. Then the first elastic members 41 and the second elastic member 42 are elongated, such that to provide tension against the lines that the first piezoelectric actuator 21 and the second piezoelectric actuator 22 bias the first supporting member 31 and the second supporting member 32 away from the base plate 10. When the angle α and the angle β are both changed to 20 degrees, the first elastic member 41 and the second elastic member 42 are compressed, such that to provide tension against the lines that the first piezoelectric actuator 21 and the second piezoelectric actuator 22 bias the first supporting member 31 and the second supporting member 32 toward the base plate 10. In the embodiment shown in FIG. 1, the first elastic member 41 and the second elastic member 42 are springs.

The first lens unit 51 and the second lens unit 52 are mounted on the first supporting portion 312 and the second supporting portion 322, respectively. The first lens unit 51 includes a first lens barrel 512, and a first lens 511, a first image sensor 513 received in the first lens barrel 512. The first image sensor 513 is positioned at a side of the first lens 511. The first image sensor 513 is configured to change light into an image signal. The first image sensor 513 may be the Charge Coupled Device (CCD), or Complementary Metal-Oxide-Semiconductor Transistor (CMOS). The lens unit 52 is similar to the lens unit 51, and includes a second lens 521, a second lens barrel 522, and a second image sensor 523.

Both of the first lens unit 51 and the second lens unit 52 are electrically connected to the image processor 60. The image processor 60 is configured to combine the image signals from the first lens unit 51 and the second lens unit 52 to produce a 3D image. The 3D camera module 100 further includes a flexible circuit 601. The first lens unit 51 is electrically connected to the second lens unit 52 via the flexible circuit 601.

Figure 2:
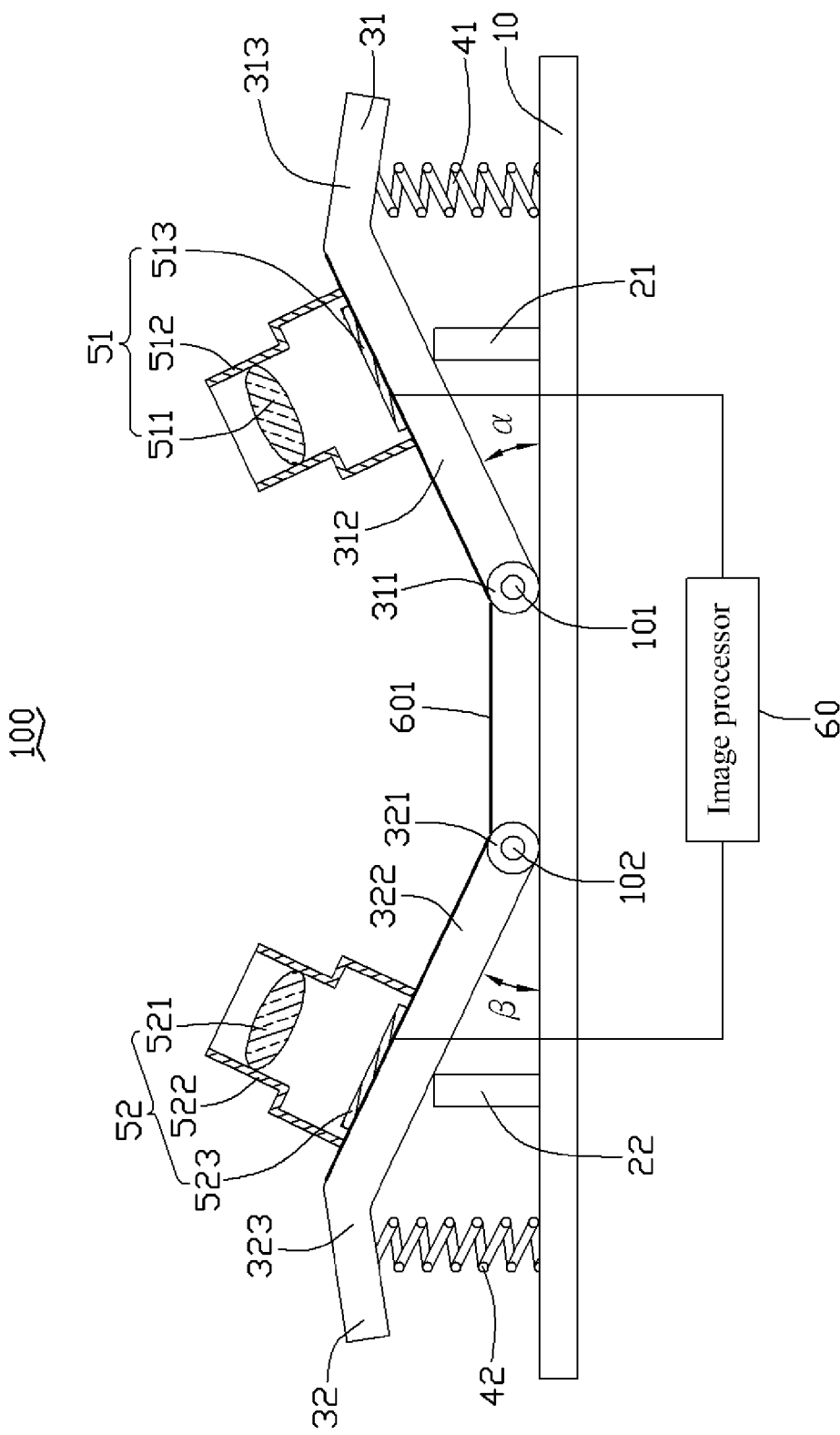
FIG. 2 is similar to FIG. 1, but shows the three-dimensional camera module in another state.

Referring to FIG. 2, the first piezoelectric actuator 21 and the second piezoelectric actuator 22 drive the first supporting member 31 and second supporting member 32 to pivot clockwise or counterclockwise around the first rotating shaft 101 and the second rotating shaft 102, respectively, so as to adjust the angle α and the angle β, and the shooting angle of the first lens unit 51 and the second lens unit 52.

In use, the angle α and the angle β are set to be predetermined angles, then the first lens unit 51 and the second lens unit 52 capture at least two images, the image processor 60 combines the two images and produces a 3D image. The first piezoelectric actuator 21 and the second piezoelectric actuator 22 drive the first supporting member 31 and second supporting member 32 to pivot around the first rotating shaft 101 and the second rotating shaft 102, respectively. Then the angle α and the angle β are changed, thus the shooting angle of the first lens unit 51 and the second lens unit 52 are changed, the first lens unit 51 and the second lens unit 52 can capture at least another two images from a different shooting angle, the image processor 60 combines the images and produces a 3D image.

In addition, the angle α and the angle β may be set to predetermined angles as desired, and the first lens unit 51 and the second lens unit 52 capture a first set of images. Then the first piezoelectric actuator 21 and the second piezoelectric actuator 22 drive the first supporting member 31 and second supporting member 32 to pivot around the first rotating shaft 101 and the second rotating shaft 102, respectively, and the first lens unit 51 and the second lens unit 52 capture a second set of images. After several sets of images are captured as required, the image processor 60 combines the images and produces a 3D image.

Figure 3:
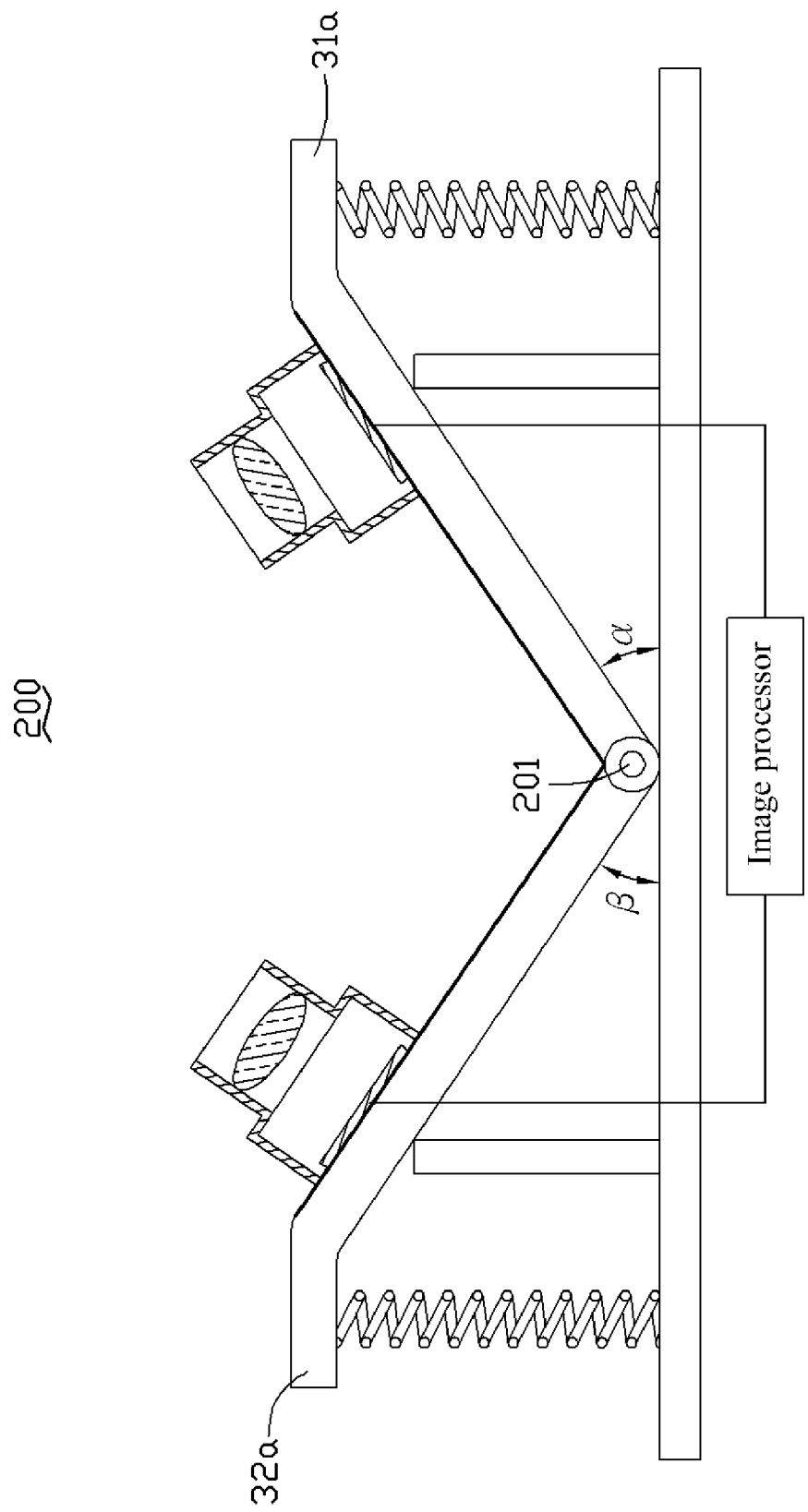
FIG. 3 is a schematic, cross-sectional view of an embodiment of a three-dimensional camera module.

Referring to FIG. 3, an embodiment of a 3D camera module 200 is shown. The 3D camera module 200 is similar to the 3D camera module 100, except that there is only one rotating shaft 201. Correspondingly, both of a first supporting member 31*a* and a second supporting member 32*a* are rotatably connected to the rotating shaft 201.

It is to be understood that, in alternative embodiments, the angle α and the angle β may be different from each other. After the first piezoelectric actuator 21 and the second piezoelectric actuator 22 drive the first supporting member 31 and second supporting member 32 to pivot around the first rotating shaft 101 and the second rotating shaft 102, respectively, the rotation angle of the first supporting member 31 and second supporting member 32 may be different. The structure of the second lens unit 52 may be different from that of the first lens unit 51. The first rotating shafts 101 and the second rotating shaft 102 may or may not be parallel to each other. The first balance portion 313, the second balance portion 323, the first elastic member 41 and the second elastic member 42 may be omitted. The number of lens unit may be more than two.

It is believed that the present embodiments and their advantages will be understood from the foregoing description, and it will be apparent that various changes may be made there to without departing from the spirit and scope of the disclosure or sacrificing all of its material advantages.

What is claimed is:

1. A three-dimensional camera module comprising:
   a base plate;
   a first rotating shaft and a second rotating shaft positioned on the base plate;
   a first supporting member rotatably fixed to the first rotating shaft;
   a second supporting member rotatably fixed to the second rotating shaft;
   a first lens unit mounted on the first supporting member;
   a second lens unit mounted on the second supporting member;
   a first piezoelectric actuator abuts the first supporting member to drive the first supporting member to pivot around the first rotating shaft;
   a second piezoelectric actuator abuts the second supporting member to drive the second supporting member to pivot around the second rotating shaft; and
   an image processor, wherein both of the first lens unit and the second lens unit are electrically connected to the image processor.

2. The three-dimensional camera module of claim 1, wherein the first supporting member comprises a first fixing portion and a first supporting portion connected to the first fixing portion, the first fixing portion is rotatably connected to the first rotating shaft, the first supporting portion abuts the first piezoelectric actuator, and the first lens unit is mounted on the first supporting portion.

3. The three-dimensional camera module of claim 2, wherein the first supporting member further comprises a first balance portion connected to the first supporting portion away from the first fixing portion.

4. The three-dimensional camera module of claim 3, further comprising a first elastic member, and two ends of the first elastic member are respectively connected to the base plate and the first balance portion.

5. The three-dimensional camera module of claim 1, wherein the second supporting member comprises a second fixing portion and a second supporting portion connected to the second fixing portion, the second fixing portion is rotatably connected to the second rotating shaft, the second supporting portion abuts the second piezoelectric actuator, and the second lens unit is mounted on the second supporting portion.

6. The three-dimensional camera module of claim 5, wherein the first supporting member further comprises a second balance portion connected to the second supporting portion away from the second fixing portion.

7. The three-dimensional camera module of claim 6, further comprising a second elastic member, and two ends of the second elastic member are respectively connected to the base plate and the second balance portion.

8. The three-dimensional camera module of claim 1, further comprising a flexible circuit, and the first lens unit is electrically connected to the second lens unit via the flexible circuit.

9. The three-dimensional camera module of claim 1, wherein the first rotating shaft and the second rotating shaft are spaced apart and aligned parallel to each other.

10. A three-dimensional camera module comprising:
    a base plate;
    a rotating shaft positioned on the base plate;
    a first supporting member and a second supporting member each rotatably fixed to the rotating shaft;
    a first lens unit mounted on the first supporting member;
    a second lens unit mounted on the second supporting member;
    a first piezoelectric actuator abuts the first supporting member to drive the first supporting member to pivot around the rotating shaft;
    a second piezoelectric actuator abuts the second supporting member to drive the second supporting member to pivot around the rotating shaft; and a image processor, wherein both of the first lens unit and the second lens unit are electrically connected to the image processor.

11. The three-dimensional camera module of claim 10, wherein the first supporting member comprises a first fixing portion and a first supporting portion connected to the first fixing portion, the first fixing portion is rotatably connected to the first rotating shaft, the first supporting portion abuts the first piezoelectric actuator, and the first lens unit is mounted on the first supporting portion.

12. The three-dimensional camera module of claim 11, wherein the first supporting member further comprises a first balance portion connected to the first supporting portion away from the first fixing portion.

13. The three-dimensional camera module of claim 12, further comprising a first elastic member, and two ends of the first elastic member are respectively connected to the base plate and the first balance portion.

14. The three-dimensional camera module of claim 10, wherein the second supporting member comprises a second fixing portion and a second supporting portion connected to the second fixing portion, the second fixing portion is rotatably connected to the rotating shaft, the second supporting portion abuts the second piezoelectric actuator, and the second lens unit is mounted on the second supporting portion.

15. The three-dimensional camera module of claim 14, wherein the first supporting member further comprises a second balance portion connected to the second supporting portion away from the second fixing portion.

16. The three-dimensional camera module of claim 15, further comprising a second elastic member, and two ends of the second elastic member are respectively connected to the base plate and the second balance portion.

17. The three-dimensional camera module of claim 10, further comprising a flexible circuit, and the first lens unit is electrically connected to the second lens unit via the flexible circuit.

18. A three-dimensional camera module comprising:
at least one rotating shaft;
a first supporting member and a second supporting member;
a first lens unit mounted on the first supporting member;
a second lens unit mounted on the second supporting member;
a first piezoelectric actuator abuts the first supporting member to drive the first supporting member to pivot around the rotating shaft;
a second piezoelectric actuator abuts the second supporting member to drive the second supporting member to pivot around the rotating shaft; and
a image processor, wherein both of the first lens unit and the second lens unit are electrically connected to the image processor.

* * * * *